US007222558B2

(12) United States Patent
Schmitt et al.

(10) Patent No.: US 7,222,558 B2
(45) Date of Patent: May 29, 2007

(54) GRIPPING PLIERS

(75) Inventors: Lothar Schmitt, Wuppertal (DE); Hans-Joachim Chniel, Wuppertal (DE)

(73) Assignee: Eduard Willie GmbH & Co KG (DE)

( * ) Notice: Subject to any disclaimer, the term of this patent is extended or adjusted under 35 U.S.C. 154(b) by 111 days.

(21) Appl. No.: 11/198,519

(22) Filed: Aug. 5, 2005

(65) Prior Publication Data

US 2006/0027055 A1 Feb. 9, 2006

(30) Foreign Application Priority Data

Aug. 6, 2004 (DE) .................. 20 2004 012 362 U

(51) Int. Cl.

*B25B 7/04* (2006.01)
*B25B 7/06* (2006.01)
*B25B 23/16* (2006.01)
*F16C 11/00* (2006.01)
*F16D 1/12* (2006.01)
*F16D 3/00* (2006.01)
*E05D 15/06* (2006.01)

(52) U.S. Cl. ............................ 81/411; 81/413; 81/394; 81/407; 81/416; 81/409; 81/177.8; 403/94; 16/361

(58) Field of Classification Search .......... 81/411–414, 81/405–409.5, 416, 177.8, 177.9, 300, 343, 81/385, 393, 394; 403/94, 97; 16/348, 357, 16/361

See application file for complete search history.

(56) References Cited

U.S. PATENT DOCUMENTS

| | | | | |
|---|---|---|---|---|
| 2,557,296 | A | 6/1951 | Kress | |
| 4,296,655 | A * | 10/1981 | Tesoro | 81/405 |
| 4,581,960 | A | 4/1986 | Putsch et al. | |
| 5,584,551 | A | 12/1996 | Jenkins | |
| 5,676,029 | A * | 10/1997 | Putsch | 81/412 |
| 6,318,217 | B1 | 11/2001 | Emhardt et al. | |
| 6,941,663 | B2 * | 9/2005 | Still | 30/250 |
| 2002/0007703 | A1 * | 1/2002 | Michel Gelos | 81/385 |

FOREIGN PATENT DOCUMENTS

| | | | |
|---|---|---|---|
| DE | 199 09 224 | A1 | 3/1999 |
| DE | 19909224 | A1 * | 9/2000 |
| DE | 202 18 090 | U1 | 11/2002 |

OTHER PUBLICATIONS

KNIPEX catalog, p. 31, Cobra Wasserpumpenzangen.

* cited by examiner

*Primary Examiner*—Joseph J. Hail, III
*Assistant Examiner*—Bryan Muller
(74) *Attorney, Agent, or Firm*—Lawrence G. Fridman

(57) ABSTRACT

Gripping pliers consisting of a jointed clamp and handle. The clamp contains a longitudinal slot with longitudinal apertures defining first and second detent positions. In the first position, the joint is movable whereas in the second position, the joint is locked. The handle is rotatably mounted on a bearing ring which permits fine adjustment of the opening width of the pliers.

7 Claims, 9 Drawing Sheets

GRIPPING PLIERS

BACKGROUND OF THE INVENTION

The invention relates to a pair of gripping pliers, generally called "water pump pliers". A pair of water pump pliers is generally understood to be a pair of pliers with a first and a second leg ("clamp" and "handle"), each of which have a handle portion and a pliers yaw and which are interconnected between the handle portions and the pliers yaws by means of a joint. The joint is guided in a longitudinal aperture of the first leg, this aperture being provided with detents. By adjusting the joint in the longitudinal aperture, the opening width of the pliers, i.e. the spacing of the pliers yaws, can be varied with substantially parallel gripping surfaces. By such an arrangement, it is possible to adapt the opening width to the dimensions of the part to be gripped and to grasp parts of considerably different diameters in the same way. A flat section with a longitudinal slot is provided at the clamp, the handle extending through this longitudinal slot. Parallel cheeks are formed on both sides of this longitudinal slot.

DESCRIPTION OF THE PRIOR ART

Gripping pliers of this type are known, wherein the joint, in a first axial position thereof, can be shifted in the longitudinal aperture and, in a second axial position thereof, can be locked in one of a series of detent positions. (company catalogue of KNIPEX.page 73: "KNIPEX-Cobra, EP 0 116 305 A1, EP 0 528 252 A1, EP 0 774 324 A2). With these prior Art gripping pliers, a single longitudinal aperture is provided in the central pliers clamp. The cheeks of the handle have bearing bores of different diameters. The detent positions are defined by two toothed edges having generally triangular teeth. The joint has a detent body, which has a cylindrical bearing surface of relatively large diameter, a section with opposite toothing structures adapted to engage the toothed edges, and a cylindrical bearing surface of relatively small diameter. The small diameter bearing surface extends, as a push button, out of the handle. In a first axial position of the detent body, the push button is depressed. In this position, the large diameter bearing surface is pushed out of the handle. The section with the toothing structures is located in a bore of the handle having the relatively large diameter. The bearing surface having the smaller diameter is located between the teeth of the two toothed edges. Thereby, the handle can be adjusted relative to the clamp along the longitudinal apertures. In the second axial position, the toothed section engages the toothed edges. Thereby, the joint is locked. The large diameter bearing surface is rotatable in the corresponding bore. The small diameter section is rotatable in the bore of small diameter. Now the handle can be rotated in the new detent position with the two cylindrical bearing surfaces relative to the clamp.

EP 0 904 898 B1 describes a pair of gripping pliers, wherein two aligned longitudinal apertures are provided in the cheeks. Each of the longitudinal apertures is formed by overlapping bores. Each of the bores defines a detent position for a joint. A first longitudinal aperture is formed by bores of relatively small diameters, while the second longitudinal bore is formed by bores of relatively large diameters. A bore in the handle has also the relatively large diameter. The joint is formed by a twice stepped, axially displaceable pivot, which has a push button of smaller diameter extending out of the clamp. In a first axial position, the push button of smaller diameter is located in the first longitudinal aperture, and the opposite section with the relatively large diameter is pushed out of the bore of the second longitudinal aperture. In this axial position, the joint with the handle can be shifted in the clamp along the longitudinal apertures. In a second axial position, the median section of the stepped pivot rotates in one of the bores forming the first longitudinal aperture, while the end section of the stepped pivot is rotatable in a bore which forms part of the second longitudinal aperture.

With this prior art pair of gripping pliers, the detent positions are defined by the overlapping bores of the longitudinal apertures. These bores, at the same time, are the bearing surfaces for the pivot forming the joint. With this pair of gripping pliers, the distance of the detent positions is defined by the dimensions of the bores. These bores, however, have to have a certain size, whereby the possible minimum spacing of the detent positions is limited.

SUMMARY OF THE INVENTION

It is an object of the invention to improve the bearing structure of the joint in pairs of gripping pliers of this type. It is another object of the invention, to permit fine adjustment of the opening width of the pair of gripping pliers.

To this end a pair of gripping pliers is provided comprising a pliers clamp and a pliers handle, said pliers clamp having a handle portion at one end and a pliers yaw at the opposite end, and said pliers handle having a handle portion at one end and a pliers yaw at the opposite end. Said clamp has a longitudinal slot between said handle portion and said pliers yaw thereof, said longitudinal slot defining a pair of parallel inner surfaces. Said pliers handle extends through said longitudinal slot. Said clamp has aligned longitudinal apertures on both sides of said longitudinal slot, said longitudinal apertures defining detent positions. The pair of gripping pliers further comprises joint means for articulated interconnection of said clamp and said handle. Said joint means include a detent body movable between a first axial position and a second axial position, said detent body, in its first axial position, permitting movement of said joint means in said longitudinal slot and, in its second axial position, is adapted to lock in anyone of said detent positions.

Said detent positions are defined by toothed edges along at least one of said aligned longitudinal apertures. Said detent body has at least two axially spaced detent lugs for engagement with said toothed edges. Said joint means comprise a bearing ring with end faces, said bearing ring surrounding said detent body and having axial dimensions substantially equal to those of said handle, said bearing ring being guided with its end faces between said inner surfaces of said slot. Said pliers handle is rotatably mounted on said bearing ring, and said bearing ring is a profiled ring having a central aperture and radial recesses extending from said central aperture, said radial recesses being substantially complementary to said detent lugs, a pair of said detent lugs of said detent body engaging said radial recesses in said second detent position of said detent body.

In this way, the joint, on one hand, is ruggedly supported in detent positions provided on both sides of the central second leg. On the other hand, a fine adjustment in accordance with the tooth spacing of the toothed edges is possible. Preferably said toothed edges comprise teeth and tooth gaps of substantially triangular shape, and said detent lugs are substantially roof-shaped projections of said detent body. This permits very fine adjustment of the opening width of the gripping pliers.

It is advantageous, if detent lugs of said detent body partly engage said radial recesses of said profiled bearing ring also in said second axial position of said detent body. Thereby, the relative orientation of the profiled bearing ring with respect to the detent lugs is ensured, such that movement of the detent body from its first axial position to its second axial position is always possible.

The pair of pliers may further comprise resilient means for biasing said detent body towards said second axial position, said resilient means being supported by said profiled bearing ring. In order to reduce friction, when shifting the joint, said profiled bearing ring may have a stepped peripheral surface and may be mounted in a correspondingly stepped bore of said handle such as to maintaining an end face of said profiled bearing ring remote from said resilient means spaced from the neighboring one of said inner surfaces of said longitudinal slot.

DESCRIPTION OF THE EMBODIMENT

Figure 1:
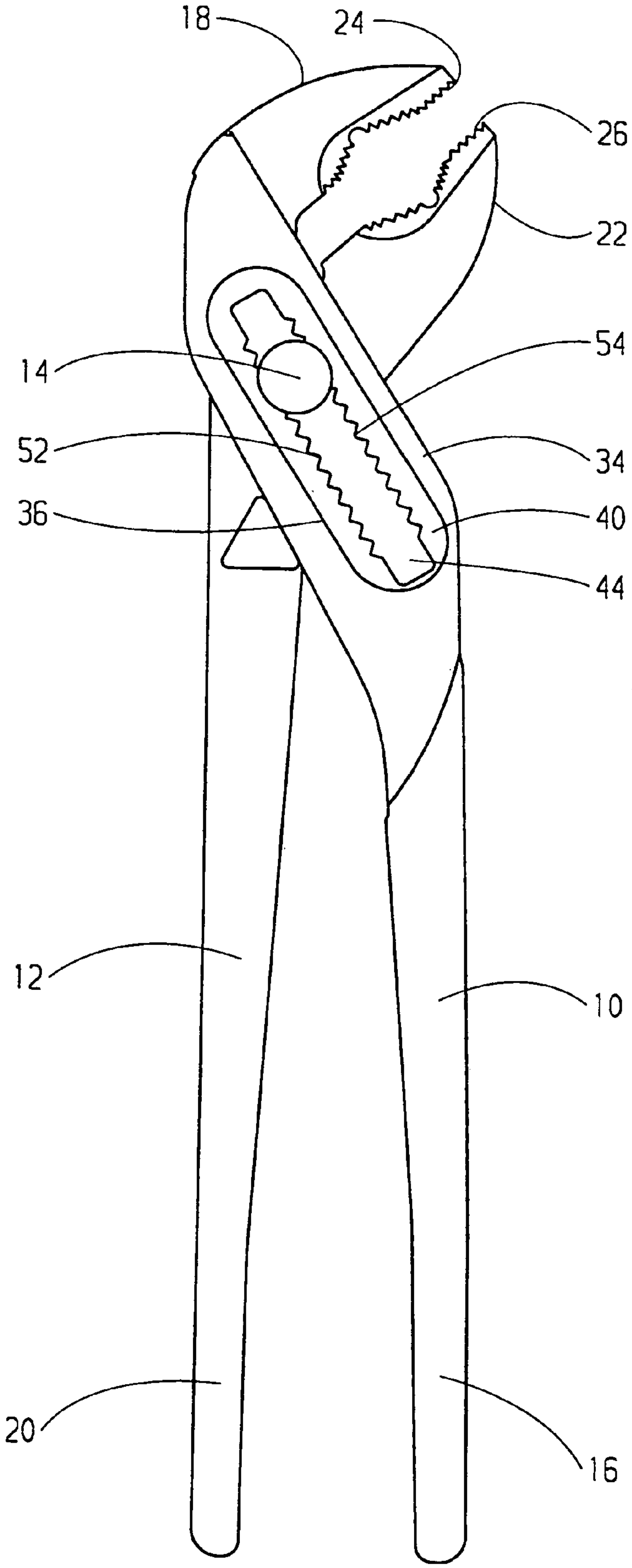
FIG. 1 is a view of a pair of gripping pliers as viewed from one side.
Figure 2:
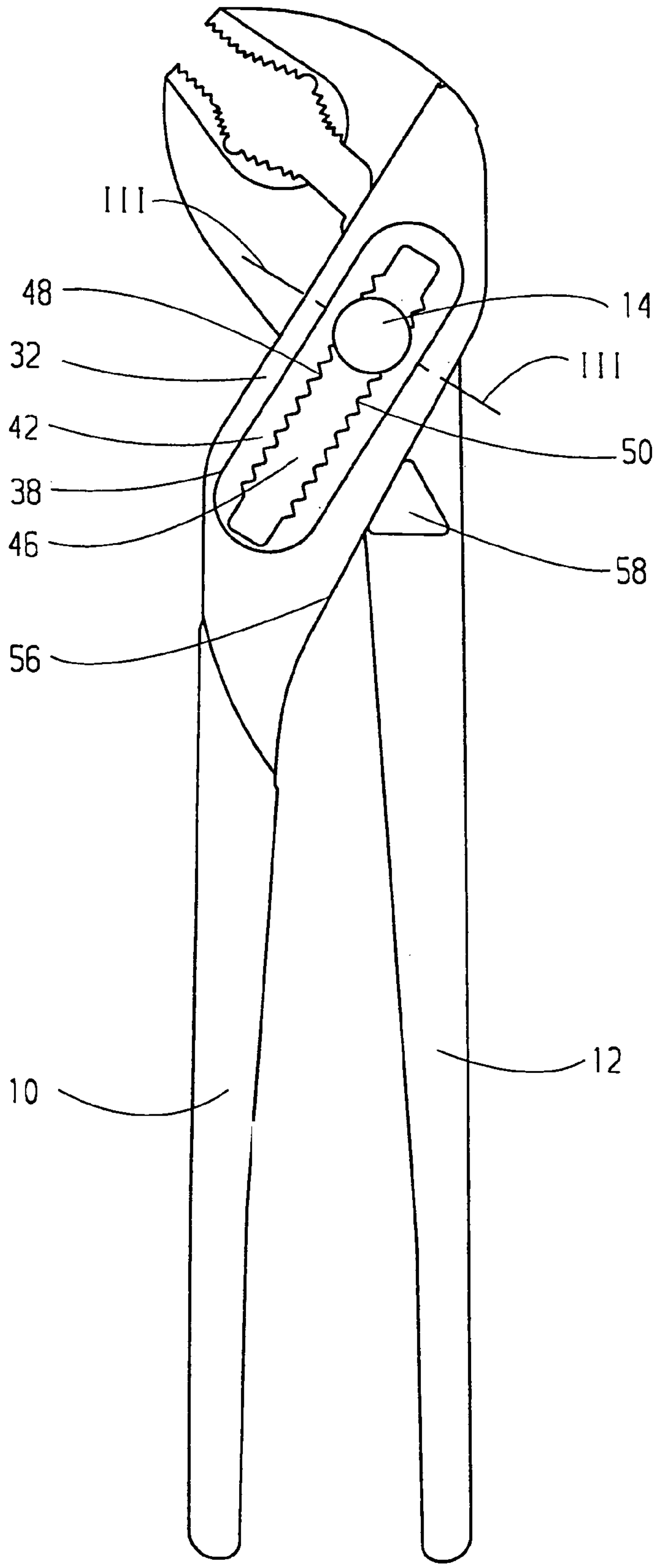
FIG. 2 shows the pair of gripping pliers as viewed from the opposite side.

FIGS. 1 and 2 show a pair of gripping pliers viewed from opposite sides. In the art, such a pair of gripping pliers is termed “water pump pliers”. The gripping pliers has a first leg or “clamp” 10 and a second leg or “handle” 12. Clamp and handle are articulated by means of a joint 14. The clamp 10 has a handle portion 16 and a pliers yaw 18. The handle 12 has a handle portion 20 and a pliers yaw 22. The pliers yaws 18 and 22 are angled relative to the handle portions 16 and 20, respectively, such that their gripping surfaces 24 and 26, respectively, facing each other are substantially parallel, when the pair of gripping pliers is in its closing or gripping position. Each of the gripping surfaces forms a recess toothed in conventional manner to permit holding of a tube or the like between the gripping surfaces.

Figure 5:
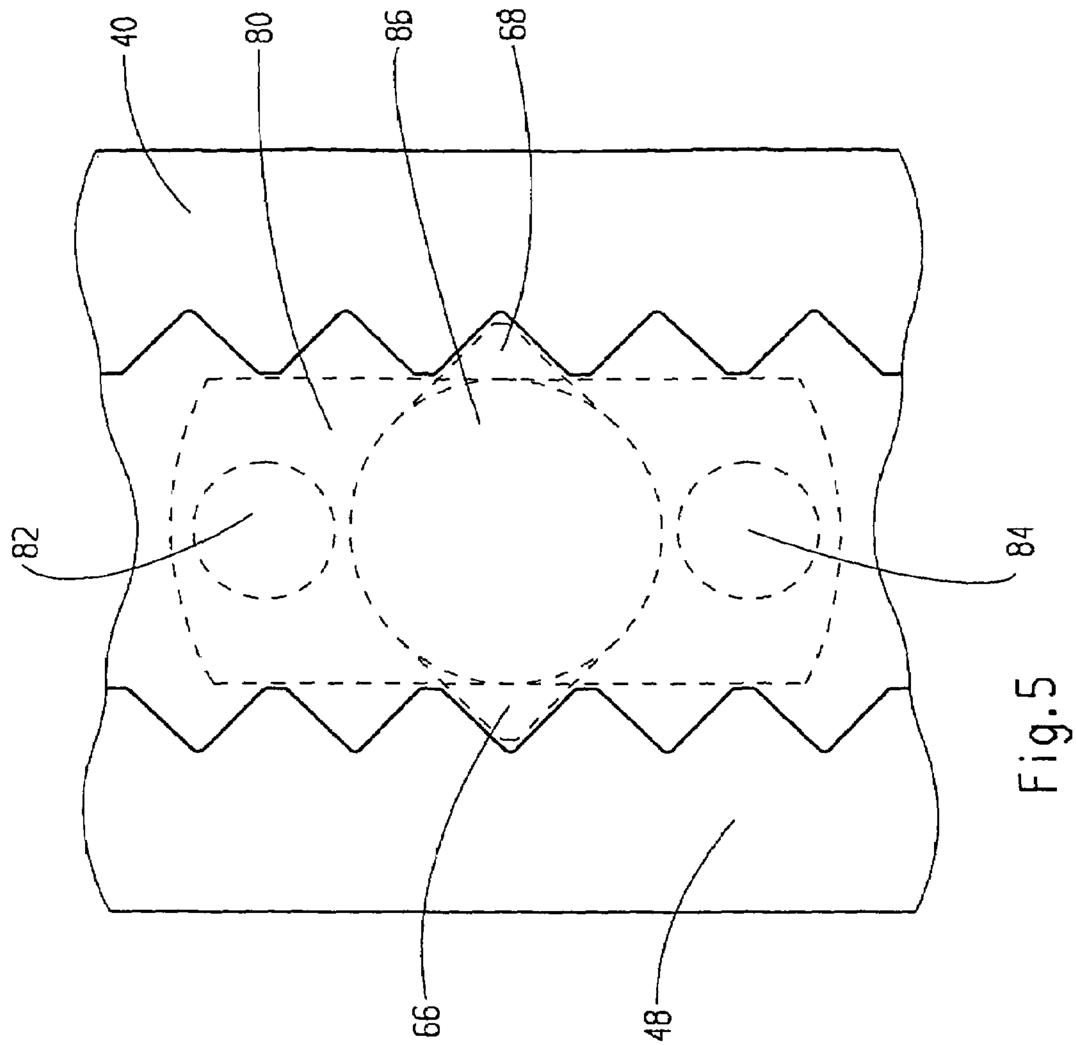
FIG. 5 is an enlarged illustration as viewed in the direction of the joint axis of the gripping pliers and shows the elongated aperture provided with detents, a profiled bearing ring for the mounting of the handle and a detent body.

In the region of the joint 14, the clamp 10 has a slot 28 (FIG. 3 or 3A) extending through the clamp 10, the plane of this slot extending normal to the axis of rotation 30 of the joint 14. Clamp halves or cheeks 32 and 34 are formed on both sides of the slot 28. These clamp halves or cheeks 34 and 34 are plate-like broadened relative to the end portion of the handle portion 16. Elongated apertures are 36 and 38 are provided in these clamp halves 32 and 34, respectively. Plates 40 and 42 are retained in these apertures 36 and 38, respectively. Longitudinal apertures 44 and 46 are formed in these plates 40 and 42, respectively. The longitudinal apertures 44 and 46 are aligned. Detent positions are provided along the longitudinal apertures 44 and 46. The detent positions are defined by pairs of toothed edges 48, 50 and 52, 54 facing each other (FIGS. 4 and 5. The toothed edges consist of teeth and tooth gaps of substantially triangular shape.

The handle 12 extends through the slot 28. The joint interconnects clamp 10 and handle 12. The joint can be locked in the various detent positions defined by the toothed edges 48, 50 and 52, 54. In a stop position, the inclined outer surface of the plate-like section 56 of the clamp 10 engages a stop 58 of the handle 12 (FIG. 2). In this stop position, the gripping surfaces 24 and 26 of the two plier yaws 18 and 22, respectively, are substantially mutually parallel. The opening width, i.e. the spacing of the plier yaws in this parallel position is varied depending on the detent position in which the joint 14 is locked. In this way, the opening width can be adapted to the dimensions of the objects to be handled. Objects of widely different dimensions can be grasped by the pair of gripping pliers in substantially the same way.

Figure 3:
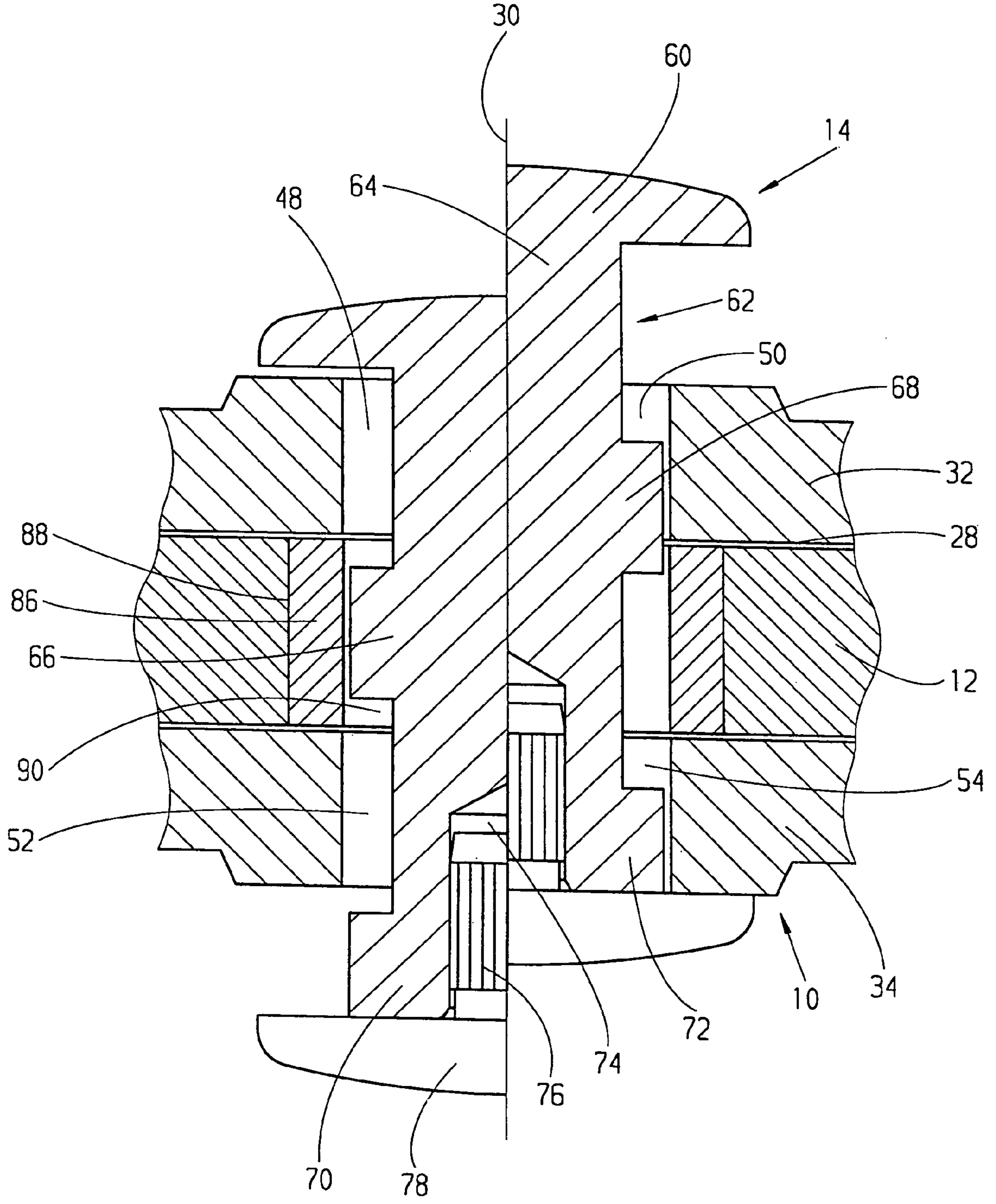
FIG. 3 is a sectional view taken along line III—III of FIG. 2 of a first embodiment of the pair of gripping pliers.
Figure 4:
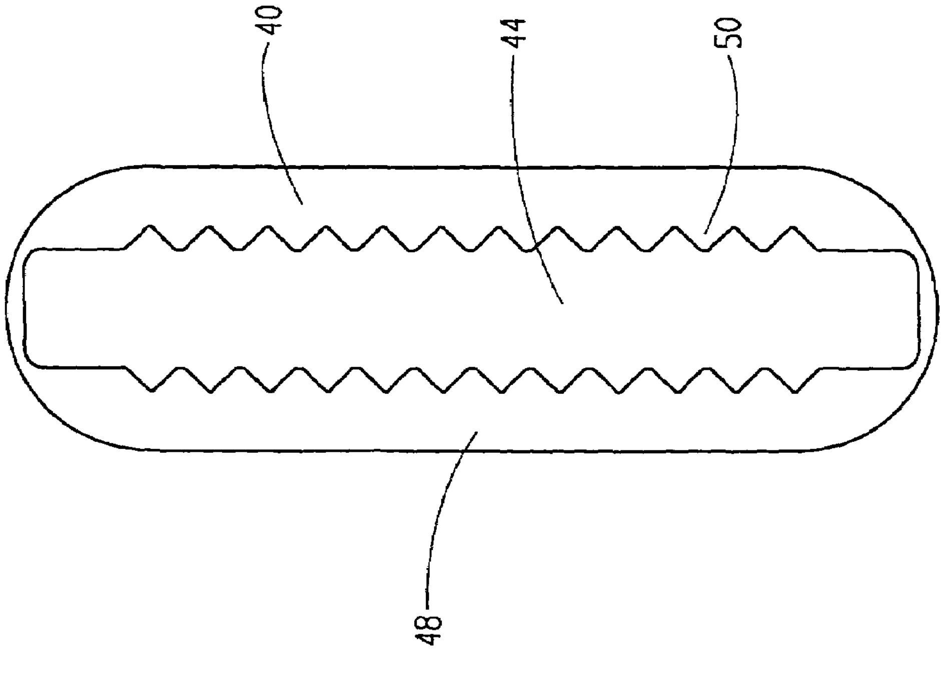
FIG. 4 is a detail view and shows an insert with elongated aperture and detents in the pair of gripping pliers of FIGS. 1 and 2.

The construction of the lockable joint 14 can best be seen from FIG. 3. The joint 14 has a spring-loaded push-button 60. By depressing this push-button, the joint is released from its detent position and can be shifted in the longitudinal apertures 44 and 46 into another detent position. The push-button forms part of a detent body 62. The detent body has a shaft 64 provided centrally at the detent body 60. The shaft extends through the longitudinal apertures 44 and 46 of the clamp 10. Two pairs of diametrically opposite detent lugs 66, 68 and 70, 72 are integral with the shaft 64. The pairs of detent lugs 66, 68 and 70, 72 axially spaced such that, in the operative position illustrated on the right side in FIG. 3, the detent lugs 66 and 68 engage the toothed edges 48 and 50, respectively, and the detent lugs 70 and 72 engage the toothed edges 52 and 54, respectively. In the right portion of FIG. 4, the joint 14 is shown locked and in its operative position. In the left portion of FIG. 3, the joint 14 is illustrated such that, after depressing the push-button, it can be shifted along the longitudinal apertures 44 and 46 to a new detent position. In the lower end face of the shaft 64, as viewed in FIG. 3, a blind bore 74 is provided. A knurled shaft 76 of a push-down plate 78 is pressed into this blind bore 74.

Figure 8:
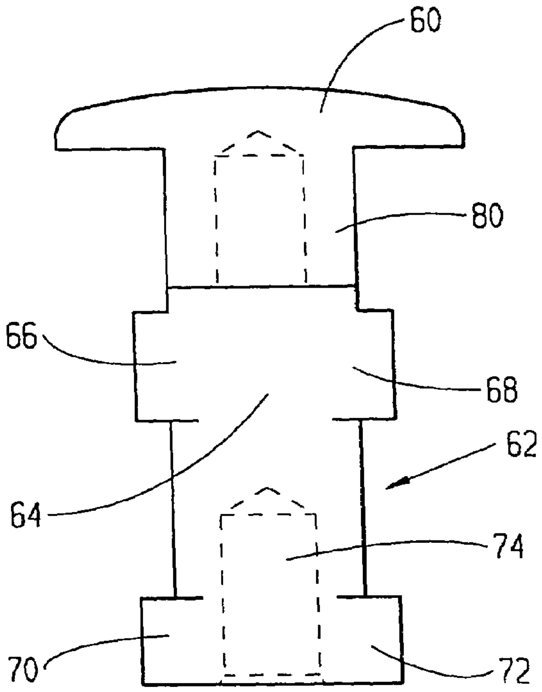
FIG. 8 is a side elevation of the major portion of the detent body.
Figure 9:
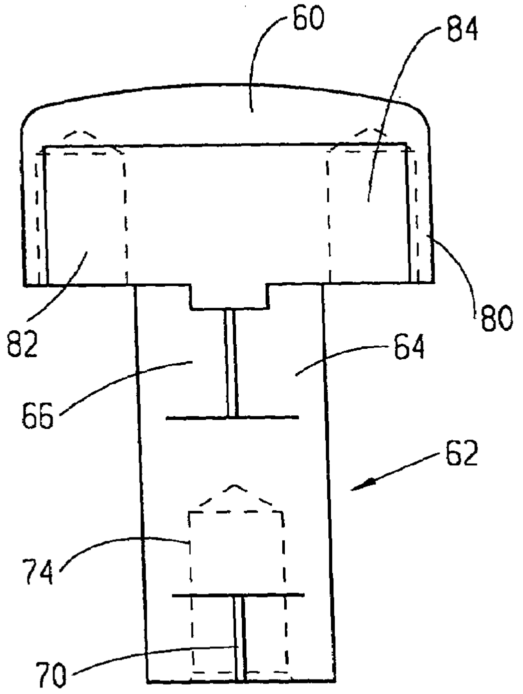
FIG. 9 is a side elevation of the major portion of the detent body as viewed from the right in FIG. 8.
Figure 10:
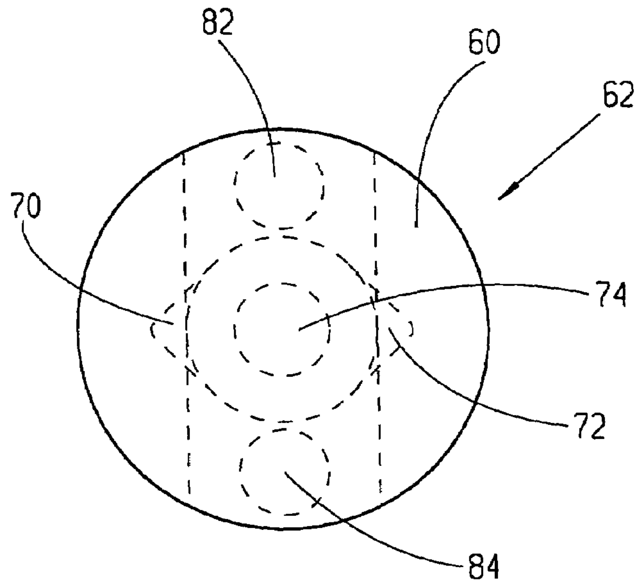
FIG. 10 is a view of the major portion of the detent body from below in FIG. 8.
Figure 11:
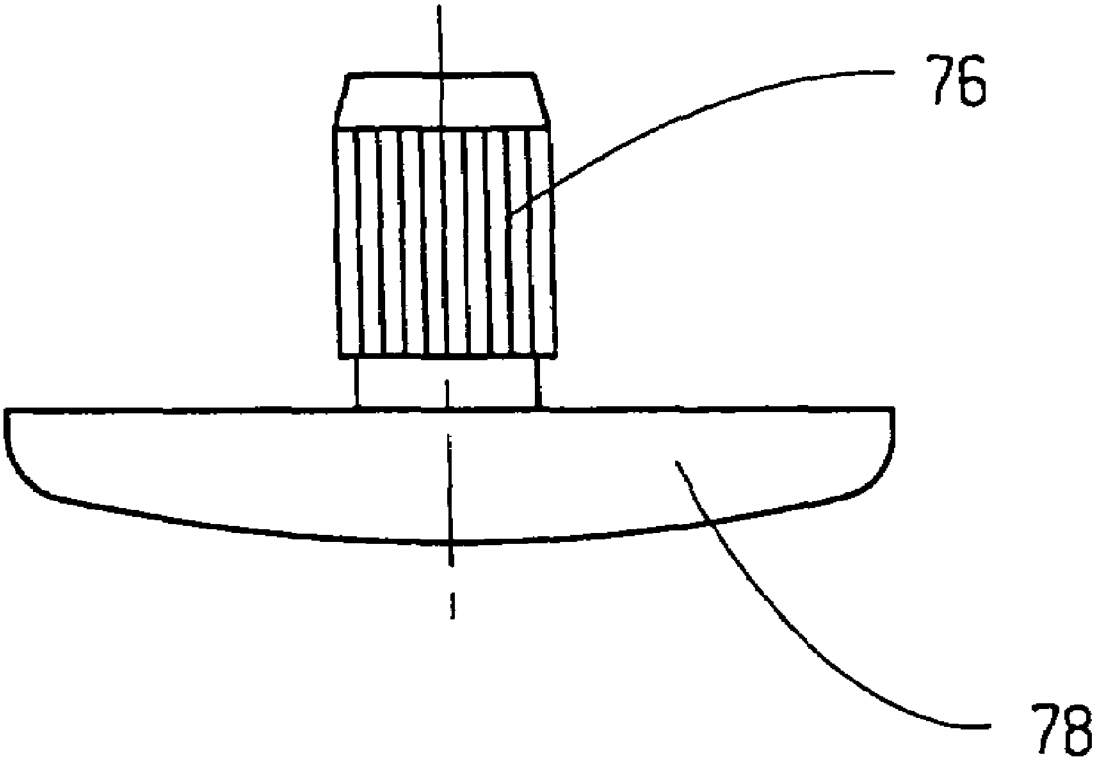
FIG. 11 is a side elevation of the push-down plate of the detent body.

FIGS. 8 to 10 are single-part drawings of the detent body 62. The detent body 62 has the push-button 60. A diametrically extending block 80 is attached to the push-button 60. When the detent body is assembled, the block 80 extends in the direction of the longitudinal apertures 44 and 46. The block 80 has axial blind bores 82 and 84 on both sides of the shaft 64. The blind bores 82 and 84 accommodate the ends of helical springs (not shown) which urge the detent body 62 into the operative position shown on the right side of FIG. 3. The pairs of detent lugs 66, 68 and 70, 72 are integral with the shaft 64. The roof-like shape of the detent lugs can be seen from FIG. 10. The blind bore 74 is illustrated in the end face of the shaft remote from the push-button.

Figure 7:
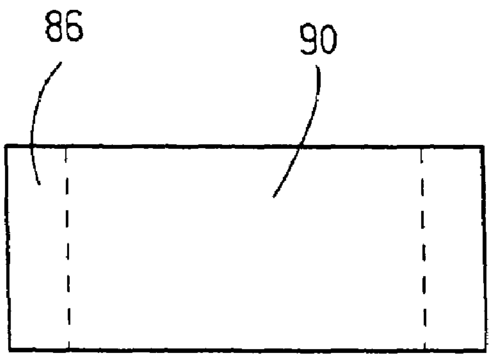
FIG. 7 is a side view of this profiled bearing body.
Figure 6:
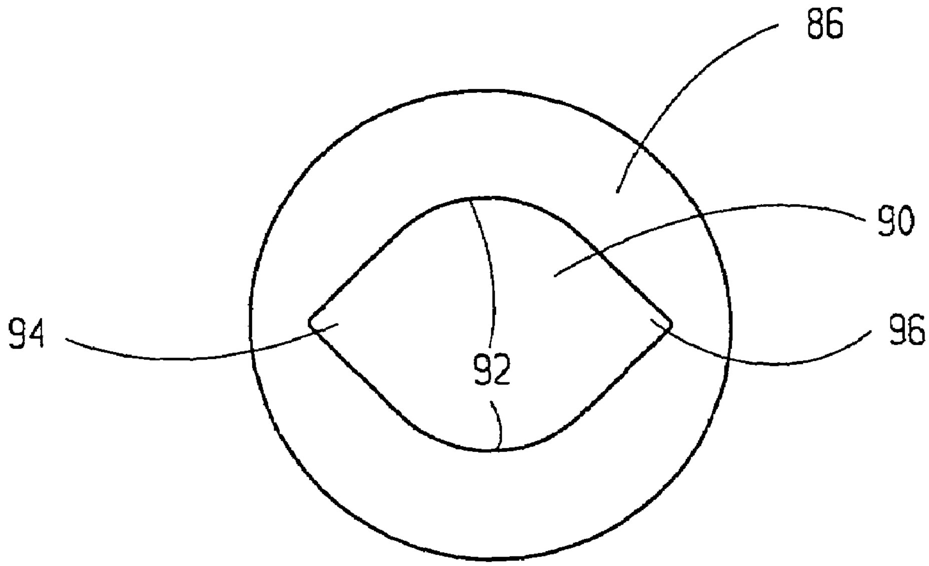
FIG. 6 is a front view of the profiled bearing body in the embodiment of FIG. 3.

A profiled bearing ring 86 is mounted on the detent body 62. In the embodiment of FIGS. 3 6 and 7, this profiled bearing ring 86 has a cylindrical peripheral surface. With this peripheral surface, the profiled bearing ring 86 is mounted in a corresponding aperture 88 of the handle 12 of the pair of gripping pliers. The thickness of the profiled bearing ring 86 is equal to the thickness of the handle 12 in the region of the longitudinal apertures 44 and 46. The end faces of the profiled bearing ring 86 are guided between the inner surfaces of the slot 28 outwards of the toothed edges 48, 50 and 52, 54. The profiled bearing ring 86 has a central aperture 90. This central aperture can be seen best from the single-part drawing of FIG. 6. The aperture 90 has a circular central portion 92 which communicates with substantially triangular, diametrically opposite recesses 94 and 96. The cross sections of the recesses 94, 96 are limited by tangents engaging the circular central portion and forming an angle of 90°. With these recesses, the profiled bearing ring is guided on the detent lugs 66 and 68 of the detent body 62. As can be seen from FIG. 3, the detent lugs 66 and 68 engage, in the operative position (on the right side of FIG. 3), the detent lugs 66 and 68 engage, with their edge portions only, edge portions of the recesses 94 and 96, so that the mutual alignment of detent body and profiled bearing ring is ensured. After the push-button 60 has been depressed (left side of FIG. 3) the detent lugs 66 and 68 engage the recesses 66 and 68 on their whole length symmetrically to the transverse center plane of the profiled bearing ring 68. If then the joint 14 is shifted along the longitudinal apertures 44 and 46, the profiled bearing ring 86 is coupled symmetrically with the detent body 62, whereby no tilting torques occur.

As can be seen from the left portion of FIG. 3, the joint 14 is de-coupled from the outer leg, after the push-button 60 has been depressed. The detent lugs 66 and 68 are out of engagement with the toothed edges 48 and 50, respectively. The detent lugs 70 and 72 are out of engagement with the toothed edges 52 and 54, respectively. The detent lugs 66 and 68 engage the recesses 94 and 96, respectively, of the profiled bearing body 86. The detent lugs 70 and 72 are located outside the cheek 34. In this state, the handle 14 with the joint 14, the detent body 62 and the profiled bearing ring 86 can be shifted along the longitudinal apertures 44 and 46. Thereby, the opening width of the gripping pliers can be adapted to the dimensions of the object to be grasped. In practice, this is done in the following way: The gripping pliers are widely opened. Then the pliers yaw 18 of the clamp is brought with its gripping surface 24 into engagement with the object to be grasped. The push-button 60 is pressed down, and the joint 14 together with the handle 12 is shifted in the longitudinal apertures relative to the clamp, until the gripping surface 26 of the pliers yaw 22 of the handle engages the object to be grasped. Then the push-button 60 is released. Hereby, the detent body 62 returns to its operative position (right portion of FIG. 3). The detent lugs 66 and 68 engage the toothed edges 48 and 50, respectively, and the detent lugs 70 and 72 engage the toothed edges 52 and 54, respectively. Because of the finely graduated gear profile of the toothed edges, fine adjustment of the joint 14 is possible. The joint 14 is supported in the two cheeks 32 and 34 of the clamp 10 on both sides of the handle. This results in a rugged design.

Figure 3A:
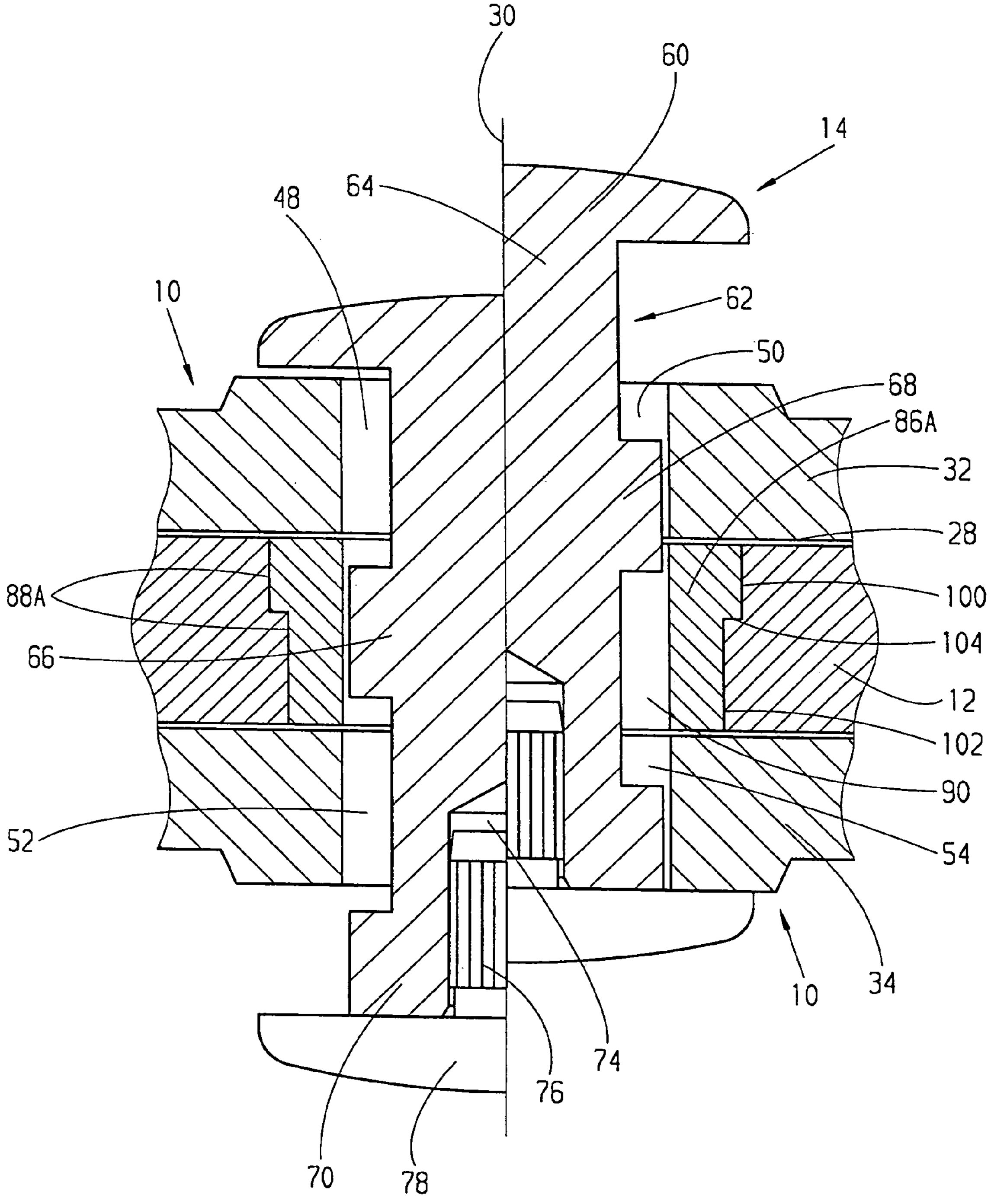
FIG. 3A is a sectional view taken along line III—III of FIG. 2 of a modified embodiment of the pair of gripping pliers.
Figure 7A:
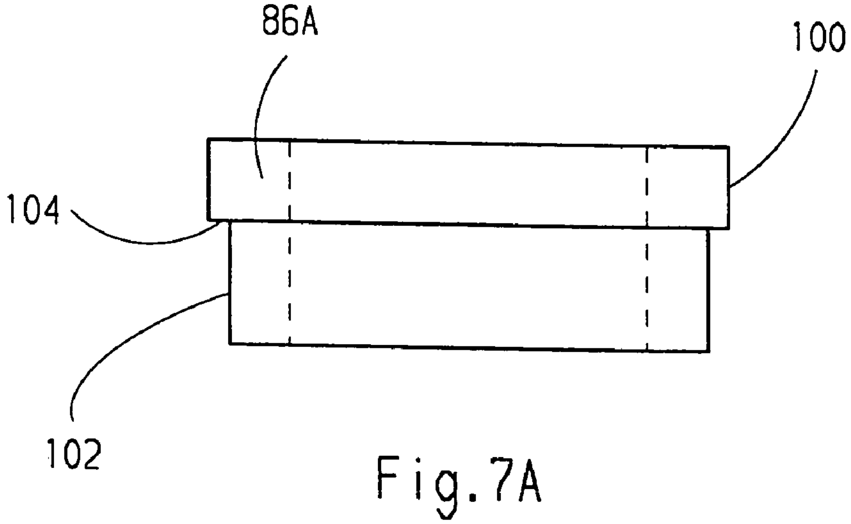
FIG. 7A is a side view of the profiled bearing body of FIG. 6A.
Figure 6A:
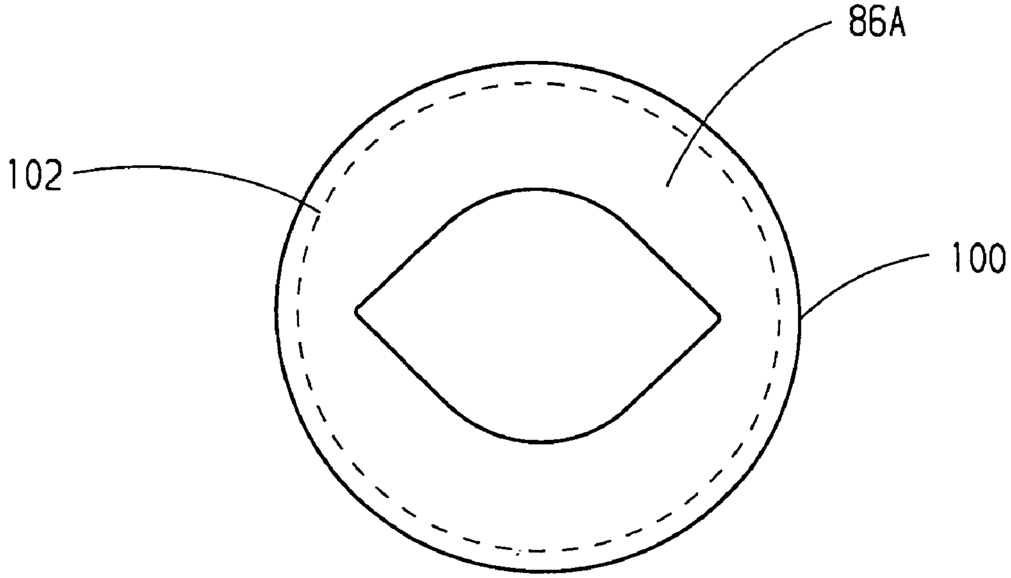
FIG. 6A is a front view of the profiled bearing body in the embodiment of FIG. 3A.

The helical springs (not shown) which are retained with one end in the bores 82 and 84 of the detent body 62 are supported on the profiled bearing ring 86. They extend through the longitudinal aperture 44. Because of this support, a reaction force is generated which urges the profiled bearing ring 86 towards the inner surface of the clamp half or cheek 34. Thereby, friction is caused, which counter-acts any shift of the joint. The profiled bearing ring 86 is part of the joint 14 and is shifted relative to the clamp half, when the joint is shifted. This friction is avoided with an arrangement as shown in FIG. 3A and FIGS. 6A and 7A. The joint 14 is of similar construction as that of FIG. 3 and FIGS. 6 and 7, and corresponding elements bear the same reference numerals.

As can be seen from FIGS. 6 and 7, the peripheral surface of the profiled bearing ring 86A is stepped. The peripheral surface comprises a cylindrical section 100 of relatively large diameter and a cylindrical section 102 of relatively small diameter. The diameter of the section 102 is about equal to the outer diameter of the profiled bearing ring 86 of FIGS. 3, 6 and 7. A step or annular shoulder 104 is formed between the sections 100 and 102. The aperture 88A of the handle 12, corresponding to aperture 88 of FIG. 3 has an inner surface stepped complementarily to the profiled bearing ring, and widens stepwise towards the top of FIG. 3A.

With such an arrangement, the reaction force of the helical springs, which acts between block 80 and profiled bearing ring 86A, will not be taken up by the clamp 10 but by the median handle 12 of the pair of gripping pliers. Then the profiled bearing ring rests with the step or annular shoulder 104 on the corresponding annular shoulder of the stepped aperture 88A. Thus the profiled bearing ring is supported on the handle. When the joint 14 is shifted, the handle 12 is moved together with the joint 14 in the longitudinal apertures 44 and 46. Thereby, no relative movement between these parts occurs and, consequently, also no frictional resistance due to the helical springs.

What is claimed is:

1. Gripping pliers, comprising: a pliers clamp and a pliers handle, said pliers clamp having a handle portion at one end and a pliers yaw at the opposite end, and said pliers handle having a handle portion at one end and a pliers yaw at the opposite end, said clamp having a longitudinal slot between said handle portion and said pliers yaw thereof, said longitudinal slot defining a pair of parallel inner surfaces, said pliers handle extending through said longitudinal slot, said clamp having aligned longitudinal apertures on both sides of said longitudinal slot, said longitudinal apertures defining detent positions, and further comprising a joint for articulated interconnection of said clamp and said handle. said joint including a detent body movable between a first axial position and a second axial position, said detent body, in its first axial position, permitting movement of said joint in said longitudinal slot and, in its second axial position, is adapted to lock in anyone of said detent positions, wherein said detent positions are defined by toothed edges along at least one of said aligned longitudinal apertures, said detent body has at least two axially spaced detent lugs for engagement with said toothed edges, said joint comprise a bearing ring with end faces, said bearing ring surrounding said detent body and having axial dimensions substantially equal to those of said handle, said bearing ring being guided with its end faces between said inner surfaces of said slot, said pliers handle is rotatably mounted on said bearing ring, and said bearing ring is a profiled ring having a central aperture and radial recesses extending from said central aperture, said radial recesses being substantially complementary to said detent lugs, a pair of said detent lugs of said detent body engaging said radial recesses in said second axial position of said detent body.

2. The gripping pliers as claimed in claim 1, wherein each of said longitudinal apertures has a pair of opposite toothed edges.

3. The gripping pliers as claimed in claim 2, wherein said detent body has two axially spaced pairs of diametrically opposite detent lugs.

4. The gripping pliers as claimed in claim 1, wherein said toothed edges comprise teeth and tooth gaps of substantially triangular shape, and said detent lugs are substantially triangular projections of said detent body.

5. The gripping pliers as claimed in claim 1, wherein detent lugs of said detent body also partly engage said radial recesses of said profiled bearing ring in said second axial position of said detent body.

6. The gripping pliers as claimed in claim 1, and further comprising resilient means for biasing said detent body towards said second axial position, said resilient means being supported by said profiled bearing ring.

7. The pliers as claimed in claim 6, wherein said profiled bearing ring has a stepped peripheral surface and is mounted in a correspondingly stepped bore of said handle such as to maintaining an end face of said profiled bearing ring remote from said resilient means spaced from the neighboring one of said inner surfaces of said longitudinal slot.

* * * * *